US011362440B2

(12) United States Patent
Zenkyu et al.

(10) Patent No.: US 11,362,440 B2
(45) Date of Patent: Jun. 14, 2022

(54) ANTENNA DEVICE, WIRELESS TRANSMITTER, WIRELESS RECEIVER, AND WIRELESS COMMUNICATION SYSTEM

(71) Applicant: NEC CORPORATION, Tokyo (JP)

(72) Inventors: Ryuji Zenkyu, Tokyo (JP); Eisaku Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 41 days.

(21) Appl. No.: 16/937,040

(22) Filed: Jul. 23, 2020

(65) Prior Publication Data

US 2021/0028560 A1    Jan. 28, 2021

(30) Foreign Application Priority Data

Jul. 25, 2019   (JP) .............................. JP2019-137278

(51) Int. Cl.
*H01Q 21/24*   (2006.01)
*H04B 1/02*   (2006.01)

(52) U.S. Cl.
CPC ............. *H01Q 21/245* (2013.01); *H04B 1/02* (2013.01)

(58) Field of Classification Search
CPC ................................ H01Q 21/245; H04B 1/02
See application file for complete search history.

(56) References Cited

U.S. PATENT DOCUMENTS

| 5,739,812 | A | * | 4/1998 | Mochizuki | G06F 3/011 345/163 |
| 6,137,996 | A | * | 10/2000 | Baumann | H01Q 1/362 455/284 |
| 10,505,284 | B2 | * | 12/2019 | Yu | H01Q 19/10 |
| 10,651,565 | B1 | * | 5/2020 | Harper | H01Q 21/28 |
| 2001/0005685 | A1 | * | 6/2001 | Nishimori | H01Q 3/2605 455/562.1 |
| 2005/0179605 | A1 | * | 8/2005 | Iigusa | H01Q 9/20 343/745 |
| 2008/0062065 | A1 | * | 3/2008 | Yamamoto | H01Q 1/243 343/861 |
| 2008/0231420 | A1 | * | 9/2008 | Koyama | G06K 7/10316 340/10.1 |
| 2008/0261539 | A1 | * | 10/2008 | Chen | H04B 1/18 455/73 |
| 2008/0274697 | A1 | * | 11/2008 | Ito | G06K 7/0008 455/42 |
| 2009/0060065 | A1 | * | 3/2009 | Walker | H04B 7/18523 455/12.1 |
| 2009/0066601 | A1 | * | 3/2009 | Eom | H01Q 25/001 343/798 |
| 2009/0102704 | A1 | * | 4/2009 | Fujimura | G01S 7/025 342/25 A |

(Continued)

FOREIGN PATENT DOCUMENTS

JP    2018-207172 A    12/2018

*Primary Examiner* — Dominic E Rego
(74) *Attorney, Agent, or Firm* — Sughrue Mion, PLLC

(57) ABSTRACT

An antenna device includes a plurality of antenna elements. Each of the plurality of antenna elements outputs radio signals transmitted to another antenna device arranged so as to be opposed to the antenna device. At least one of the plurality of antenna elements is configured in such a way that a polarization direction of the radio signals to be output can be switched between a first direction and a second direction that is orthogonal to the first direction.

10 Claims, 12 Drawing Sheets

(56) References Cited

U.S. PATENT DOCUMENTS

| | | | |
|---|---|---|---|
| 2009/0189813 A1* | 7/2009 | Haas | G01S 11/026 342/384 |
| 2009/0207093 A1* | 8/2009 | Anreddy | H04B 7/0805 343/893 |
| 2010/0078252 A1* | 4/2010 | Bradley | B60R 22/00 180/268 |
| 2010/0176928 A1* | 7/2010 | Isomura | H04B 5/02 340/10.3 |
| 2010/0277395 A1* | 11/2010 | Satoh | H01Q 21/24 343/876 |
| 2010/0309853 A1* | 12/2010 | Richardson | H04L 27/261 370/329 |
| 2011/0150118 A1* | 6/2011 | Asplund | H04B 7/10 375/260 |
| 2012/0306682 A1* | 12/2012 | Ikuta | G08B 29/185 342/27 |
| 2013/0072136 A1* | 3/2013 | Besoli | H01Q 5/25 455/90.2 |
| 2013/0127685 A1* | 5/2013 | Ikehata | H01Q 21/24 343/876 |
| 2015/0063482 A1* | 3/2015 | Zhou | H04B 7/0482 375/267 |
| 2015/0118969 A1* | 4/2015 | Chen | H04W 24/06 455/67.11 |
| 2016/0169746 A1* | 6/2016 | Koyama | G01J 5/59 250/338.1 |
| 2016/0254939 A1* | 9/2016 | Miyazaki | H04L 25/03891 375/341 |
| 2016/0380361 A1* | 12/2016 | Liu | H01Q 5/371 343/810 |
| 2017/0040708 A1* | 2/2017 | Takahashi | H01P 1/165 |
| 2017/0149147 A1* | 5/2017 | Minami | H01Q 25/00 |
| 2018/0034521 A1* | 2/2018 | Asakura | H04L 5/0016 |
| 2018/0175515 A1* | 6/2018 | Boutayeb | H01Q 3/24 |
| 2018/0262923 A1* | 9/2018 | Takei | H04W 40/02 |
| 2018/0337458 A1* | 11/2018 | Rodriguez | H01Q 9/0442 |
| 2018/0366816 A1* | 12/2018 | Jan | H01Q 9/0421 |
| 2018/0366829 A1* | 12/2018 | Hsu | H01Q 7/00 |
| 2019/0132041 A1* | 5/2019 | Takei | H04W 72/1289 |
| 2019/0280394 A1* | 9/2019 | Cheng | H01Q 21/062 |
| 2019/0363760 A1* | 11/2019 | Wu | H04B 7/0456 |
| 2019/0386397 A1* | 12/2019 | Son | H01Q 5/10 |
| 2020/0350700 A1* | 11/2020 | Rogers | H01Q 15/244 |
| 2020/0373680 A1* | 11/2020 | Lin | H01Q 1/243 |
| 2021/0281313 A1* | 9/2021 | Takeda | H04B 1/44 |

* cited by examiner

ANTENNA DEVICE, WIRELESS TRANSMITTER, WIRELESS RECEIVER, AND WIRELESS COMMUNICATION SYSTEM

INCORPORATION BY REFERENCE

This application is based upon and claims the benefit of priority from Japanese patent application No. 2019-137278, filed on Jul. 25, 2019, the disclosure of which is incorporated herein in its entirety by reference.

TECHNICAL FIELD

The present disclosure relates to an antenna device, a wireless transmitter, and a wireless communication system.

BACKGROUND ART

A microwave/millimeter wave communication system is a line-of-sight communication system in which a transmission/reception station is physically fixed. Recently, demand for the microwave/millimeter wave communication system as a mobile communication infrastructure has been dramatically increasing. As the traffic in a mobile communication increases, it has been required to further increase the transmission capacity in the microwave/millimeter wave communication system. In response to this demand, a spatial multiplex transmission technique that uses an array antenna in which a plurality of antenna elements are arranged has been focused on.

As the aforementioned spatial multiplex transmission technique, a multiple-input and multiple-output (MIMO) transmission system that uses a plurality of transmission antennas and a plurality of reception antennas has been known. MIMO has hitherto been developed mainly for applications to non-line-of-sight mobile communication systems such as mobile communication systems. In a MIMO in the non-line-of-sight mobile communication system (hereinafter this MIMO is also referred to as Non Line Of Sight (NLOS)-MIMO), multiplex transmission waves in which a large number of signals overlap and vary over time due to the diffraction and reflection of radio waves are used actively and effectively.

In recent years, application of MIMO to the line-of-sight fixed wireless communication system that uses microwaves or millimeter waves has been under discussion. In MIMO in the line-of-sight fixed wireless communication (hereinafter this communication is also referred to as a Line Of Sight (LOS)-MIMO), the difference in transmission delay is adjusted by appropriately arranging a plurality of transmission antennas and a plurality of reception antennas. In the LOS-MIMO transmission, the amount of phase rotation of the carrier caused by the adjusted difference in the transmission delay contributes to improving the signal-to-noise ratio, which enables the communication capacity to increase. This LOS-MIMO transmission is distinguished from the NLOS-MIMO transmission. The LOS-MIMO transmission has been focused as a technique that addresses the demand for larger capacity caused by the increase in traffic.

As another spatial multiplex transmission technique, a technique for multiplexing electromagnetic waves using Orbital Angular Momentum (OAM) of electromagnetic waves and increasing the transmission capacity has been known. The OAM can be generated using a Uniform Circular Array (UCA) antenna. In the OAM, the trajectory of radio waves of the same phase becomes spiral with respect to the travelling direction. The number of rotations of the spiral while a radio wave travels by one wavelength is referred to as an OAM mode. OAM modes do not interfere with each other. Therefore, each OAM mode can be transmitted being superimposed with one another in the same frequency and time and can be separated from each other. The OAM mode multiplex transmission technique is a technique for performing spatial multiplexing of radio waves on one pathway using this property.

As related techniques, Japanese Unexamined Patent Application Publication No. 2018-207172 discloses an antenna arrangement determination device used for LOS-MIMO transmission. In Japanese Unexamined Patent Application Publication No. 2018-207172, an antenna device includes a plurality of antennas. The plurality of antennas are configured in such a way that the distance between antennas is adjustable. The antenna arrangement determination device generates candidate values of a distance between a plurality of antennas at an interval according to an installation height of an any one of the plurality of antennas. The antenna arrangement determination device calculates communication quality in a case of setting the distance between the plurality of antennas at the generated candidate values. The antenna arrangement determination device determines a setting value of the distance between the plurality of antennas from the plurality of candidate values based on the communication quality that has been calculated. The antenna arrangement determination device adjusts the distance between the plurality of antennas based on the setting value that has been determined.

In spatial propagation of MIMO, electromagnetic waves radiated from a plurality of antennas are received by a plurality of antennas, which causes an effect of a superposition of waves. The effect of the superposition of waves can be expressed as an increase and/or decrease, i.e., a gain of the reception quality with respect to single-input and single-output (SISO). The increase and/or decrease of the reception quality with respect to SISO is herein referred to as MIMO GAIN. Since MIMO GAIN depends on conditions of spatial propagation, it depends on the frequency of a radio signal (this is equivalent to a wavelength ($\lambda$)), a distance between antennas opposed to each other (hereinafter this distance is also referred to as a link distance), and the arrangement of antenna elements. MIMO GAIN can be applied to each of the LOS-MIMO transmission and the OAM mode multiplex transmission. In general, the frequency of the radio signal cannot be changed since it is a fixed factor that is determined at the stage of design. Further, the link distance is determined depending on the location of a transmission/reception wireless station and cannot be changed once its location is determined. In the LOS-MIMO transmission and the OAM mode multiplex transmission, the arrangement of the antenna elements such as the radius of the array in the case of the UCA antenna is adjusted depending on the link distance. In the LOS-MIMO transmission and the OAM mode multiplex transmission, it is required to adjust the arrangement of the antenna elements so as to prevent MIMO GAIN from becoming negative, thereby maximizing the substantial number of times of multiplex transmission.

With regard to the above, in Japanese Unexamined Patent Application Publication No. 2018-207172, intervals between antennas are physically adjusted using a drive unit such as an electric actuator. In Japanese Unexamined Patent Application Publication No. 2018-207172, however, the antenna device needs to include the drive unit such as the electric actuator. Therefore, there is a problem in Japanese Unexamined Patent Application Publication No. 2018-

207172 that the size and the weight of the antenna device increase. Therefore, physically adjusting the intervals between the antenna elements causes a problem as regards manufacturing and installation of the antenna device.

An example object of the present disclosure is to provide an antenna device, a wireless transmitter, and a wireless communication system capable of preventing a decrease in the number of times of multiplex transmission without changing the physical arrangement of the antenna elements depending on the link distance.

SUMMARY

In order to achieve the aforementioned object, the present disclosure provides an antenna device as a first aspect. The antenna device includes a plurality of antenna elements configured to output radio signals transmitted to another antenna device arranged so as to be opposed to the antenna device. At least one of the plurality of antenna elements is configured in such a way that a polarization direction of the radio signals can be switched between a first direction and a second direction that is orthogonal to the first direction.

The present disclosure provides a wireless transmitter as a second aspect. The wireless transmitter includes a radio signal generator configured to generate radio signals transmitted to a wireless receiver arranged so as to be opposed to the wireless transmitter and an antenna unit including a plurality of antenna elements configured to output the radio signals to the wireless receiver opposed to the wireless transmitter. At least one of the plurality of antenna elements is configured in such a way that a polarization direction of the radio signals can be switched between a first direction and a second direction that is orthogonal to the first direction.

The present disclosure provides a wireless communication system as a third aspect. The wireless communication system includes a wireless transmitter and a wireless receiver. The wireless transmitter includes a radio signal generator configured to generate radio signals and a transmission antenna unit including a plurality of transmission antenna elements that output the radio signals. The wireless receiver includes a reception antenna unit including a plurality of reception antenna elements that receive radio signals from the wireless transmitter and a radio signal processor configured to demodulate a transmission signal from the radio signal. At least one of the plurality of transmission antenna elements is configured in such a way that a polarization direction of the radio signals can be switched between a first direction and a second direction that is orthogonal to the first direction. At least one of the plurality of reception antenna elements is configured in such a way that a polarization direction of the radio signals can be switched between a first direction and a second direction that is orthogonal to the first direction.

BRIEF DESCRIPTION OF DRAWINGS

The above and other aspects, features, and advantages of the present disclosure will become more apparent from the following description of certain exemplary embodiments when taken in conjunction with the accompanying drawings, in which.

EXAMPLE EMBODIMENT

Figure 1:
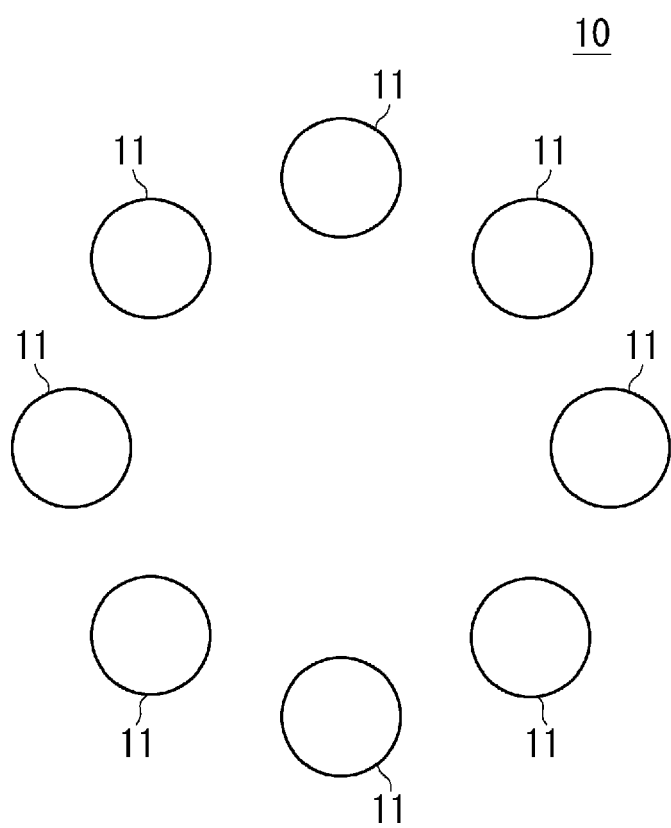
FIG. 1 is a front view schematically showing an antenna device according to the present disclosure.

Prior to giving the description of embodiments of the present disclosure, an outline of the present disclosure will be described. FIG. 1 schematically shows an antenna device according to the present disclosure. An antenna device 10 includes a plurality of antenna elements 11. Each of the antenna elements 11 outputs a radio signal transmitted to another antenna device arranged so as to be opposed to the antenna device 10. At least one of the plurality of antenna elements 11 is configured in such a way that the polarization direction of the radio signal to be output can be switched between a first direction and a second direction that is orthogonal to the first direction. For example, half of the plurality of antenna elements 11 may be configured in such a way that the polarization direction of the radio signals to be output can be switched between the first direction and the second direction. The remaining half of the plurality of antenna elements 11 may output radio signals whose polarization direction is the first direction.

For example, as shown in FIG. 1, in the antenna device 10, the plurality of antenna elements 11 are arranged at equal intervals on a circumference. The arrangement of the antenna elements 11 is not limited to the circular shape. The plurality of antenna elements 11 may be linearly arranged along a predetermined direction. The intervals between the plurality of antenna elements 11 may be set so that MIMO GAIN can ensure a predetermined quality when radio signals whose polarization direction is the same are output from all the antenna elements 11 in, for example, a predetermined link distance.

When the antenna device 10 is used in the aforementioned predetermined link distance, each of the antenna elements 11 may output a radio signal whose polarization direction is the first direction. When the antenna device is used in a link distance that is different from the aforementioned predetermined link distance, one of the plurality of antenna elements 11 may output radio signals whose polarization direction is the first direction, and at least one of the remaining antenna elements 11 may output radio signals whose polarization direction is the second direction. In the antenna device 10, for example, the antenna elements 11 that output radio signals whose polarization direction is the first direction and the antenna elements 11 that output radio signals whose polarization direction is the second direction are alternately arranged along the circumferential direction. In this case, the interval between the antenna elements 11 that output the radio signals of the respective polarization directions is twice as long as that when radio signals of a single polarization direction are output from all the antenna elements 11. Since the first direction and the second direction are orthogonal to each other, the radio signals whose polarization direction is the first direction and the radio signals whose polarization direction is the second direction do not interfere with each other.

As described above, in the LOS-MIMO transmission and the OAM mode multiplex transmission, MIMO GAIN depends on the arrangement of the antenna elements. In the present disclosure, it is possible to cause one of the plurality of antenna elements 11 to output radio signals whose polarization direction is the first direction and to cause the remaining antenna elements 11 to output radio signals whose polarization direction is the second direction. When the number of antenna elements used for the transmission of the radio signals and the interval between the antenna elements are changed in each polarized wave, MIMO GAIN is changed. In a link distance, for example, MIMO GAIN may be deteriorated when radio signals of a single polarized wave are output from all the antenna elements 11. Even in this case, high MIMO GAIN may be obtained by changing the arrangement of the antenna elements for each polarization direction.

For example, in the antenna device 10, in one link distance, four of the total of eight antenna elements 11 output, for example, radio signals whose polarization direction is the first direction. The remaining four antenna elements 11 output radio signals whose polarization direction is the second direction. In the LOS-MIMO transmission and the OAM mode multiplex transmission, when the number of antenna elements that are used is halved, the number of data streams that can be spatially multiplexed is halved. In the above case, the number of antenna elements 11 is four for each polarization direction, and the number of data streams spatially multiplexed is the same as that in a case in which radio signals whose polarization direction is the same are output from eight antenna elements. As described above, according to the present disclosure, it is possible to prevent the decrease in the number of times of multiplex transmission without changing the physical arrangement of the antenna elements 11 depending on the link distance.

Figure 2:
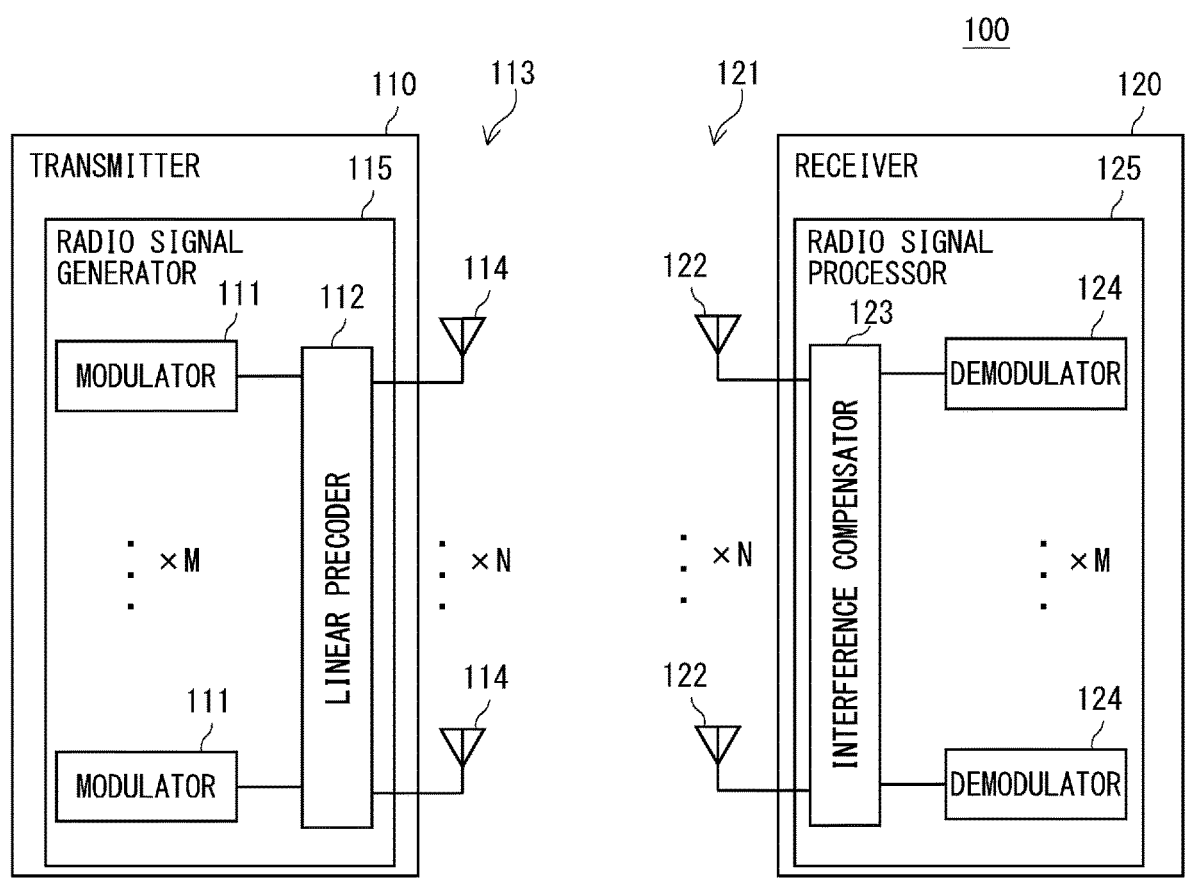
FIG. 2 is a block diagram showing a wireless communication system according to a first example embodiment of the present disclosure.

In the following, with reference to the drawings, embodiments of the present disclosure will be described. FIG. 2 shows a wireless communication system according to a first example embodiment of the present disclosure. A wireless communication system 100 includes a wireless transmitter 110 and a wireless receiver 120. The wireless transmitter 110 and the wireless receiver 120 perform line-of-sight wireless communication. In this example embodiment, the OAM mode multiplex transmission is used for spatial multiplex transmission. The wireless communication system 100 may be used, for example, for wireless communication in a mobile backhaul line.

The wireless transmitter 110 includes a radio signal generator 115 and an antenna unit 113. The radio signal generator 115 generates radio signals transmitted to the wireless receiver 120 arranged so as to be opposed to the wireless transmitter 110. The radio signal generator 115 includes a plurality of modulators 111 and a linear precoder 112. The radio signal generator 115 includes M modulators 111, where M is an integer equal to or larger than two. The symbol M corresponds to the number of data streams spatially multiplexed. Each of the modulators 111 modulates a transmission signal in accordance with a predetermined modulation method. Each of the modulators 111 outputs a modulation signal to the linear precoder 112.

The antenna unit 113 transmits radio signals to the wireless receiver 120. The antenna unit 113 includes N antenna elements (transmission antenna elements) 114, where N is an integer equal to or larger than two. The linear precoder 112 multiplies M modulation signals by N×M weight matrix and outputs N signals that correspond to the respective antenna elements 114. In this example embodiment, the linear precoder 112 uses a Discrete Fourier Transform (DFT) matrix as a weight matrix. The linear precoder 112 multiplexes a plurality of data streams to a plurality of OAM modes. Each of the antenna elements 114 transmits a radio signal (an OAM mode radio signal). Note that the generation of the OAM mode signals and the transmission thereof are known to the public and the detailed descriptions thereof will be omitted.

The wireless receiver 120 includes an antenna unit 121 and a radio signal processor 125. The antenna unit 121 receives radio signals from the wireless transmitter 110 arranged so as to be opposed to the wireless receiver 120. The antenna unit 121 includes N antenna elements (reception antenna elements) 122. Each of the antenna elements 122 receives the radio signal (the OAM mode radio signal) transmitted from the corresponding antenna element 114 of the wireless transmitter 110 that is opposed to the wireless receiver 120.

The radio signal processor 125 demodulates transmission signals from the radio signals. The radio signal processor 125 includes an interference compensator 123 and a plurality of demodulators 124. The interference compensator 123 separates M data streams (signals) multiplexed to the plurality of OAM modes. The interference compensator 123 multiplies the N inputs by M×N weight matrix and outputs M signals in which interference has been compensated. The radio signal processor 125 includes the M demodulators 124. Each of the demodulators 124 demodulates a signal separated by the interference compensator 123 and restores the signal modulated on the transmission side. The reception of the OAM mode signal and the separation thereof are known to the public and the detailed descriptions thereof will be omitted.

Note that the linear precoder 112 and the interference compensator 123 may be implemented as analog circuits or may be implemented as digital circuits. When the linear precoder 112 and the interference compensator 123 are implemented as analog circuits, a Butler matrix is, for example, used for each of the linear precoder 112 and the interference compensator 123.

While not shown in FIG. 2, the radio signal generator 115 may include an IF signal processor configured to convert a baseband signal into an Intermediate Frequency (IF) signal and an up-converter configured to up-convert the IF signal into, for example, a Radio Frequency (RF) signal (radio signal) such as a millimeter wave band. The radio signal processor 125 may include a down-converter configured to down-convert an RF signal into an IF signal and an IF signal processor configured to convert an IF signal into a baseband signal.

Further, the wireless transmitter 110 may not only transmit radio signals but also receive radio signals. The wireless receiver 120 may not only receive radio signals but also transmit radio signals. In this case, the wireless transmitter 110 may include, besides the radio signal generator 115, the radio signal processor 125. Further, the wireless receiver 120 may include, besides the radio signal processor 125, the radio signal generator 115. When the wireless transmitter 110 and the wireless receiver 120 transmit or receive radio signals, the antenna units 113 and 121 may be used for both the transmission and the reception of the radio signals.

Figure 3:
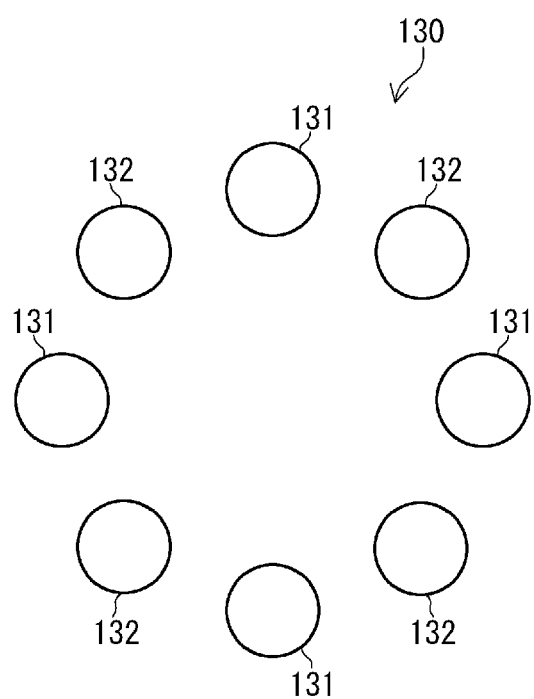
FIG. 3 is front view showing a configuration example of the antenna device.

FIG. 3 shows a configuration example of the antenna device. FIG. 3 is a front view when an antenna device 130 is seen from the front side. The antenna device 130 can be used as an antenna unit on the transmission side (transmission antenna unit) 113 and an antenna unit on the reception side (reception antenna unit) 121. In the following description, a case in which the antenna device 130 is used as the antenna unit on the transmission side 113 will be mainly described. The description of the case in which the antenna device 130 is used as the antenna unit on the reception side 121 is similar to the description of the case in which the antenna device 130 is used as the antenna unit on the transmission side 113 except that the direction of the radio signals is opposite to that in the case in which the antenna device 130 is used as the antenna unit on the transmission side 113.

The antenna device 130 includes antenna elements (first antenna elements) 131 and antenna elements (second antenna elements) 132. In this example embodiment, the antenna device 130 is formed as a circular array antenna in which radiation points of the radio signals are arranged in a circular shape. The antenna elements 131 and 132 correspond to N antenna elements 114 shown in FIG. 2. Further, the antenna elements 131 and 132 correspond to N antenna elements 122. In the example shown in FIG. 3, the antenna device 130 includes four antenna elements 131 and four antenna elements 132. That is, N=8. The antenna device 130 corresponds to the antenna device 10 shown in FIG. 1. The antenna elements 131 and 132 correspond to the antenna elements 11 shown in FIG. 1.

In this example embodiment, the antenna elements 131 and 132 are alternately arranged at equal intervals on a circumference. The antenna elements 131 output radio signals whose polarization direction is the first direction. The antenna elements 132 are configured in such a way that the polarization direction of the radio signals to be output can be switched between the first direction and the second direction that is orthogonal to the first direction. In the following description, the polarized wave in the first direction may be referred to as an H polarized wave. Further, the polarized wave in the second direction may be referred to as a V polarized wave. The antenna elements 132 are configured in such a way that the H polarized wave and the V polarized wave can be switched since the feeding points of the radio signals are, for example, changed. The antenna elements 132 are configured in such a way that the feeding points can be electrically or physically changed.

Figure 4A:
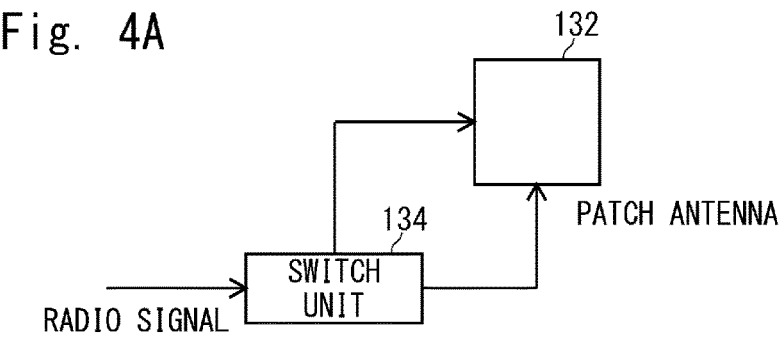
FIG. 4A is a block diagram showing a configuration example of an antenna element capable of switching polarized waves.
Figure 4B:
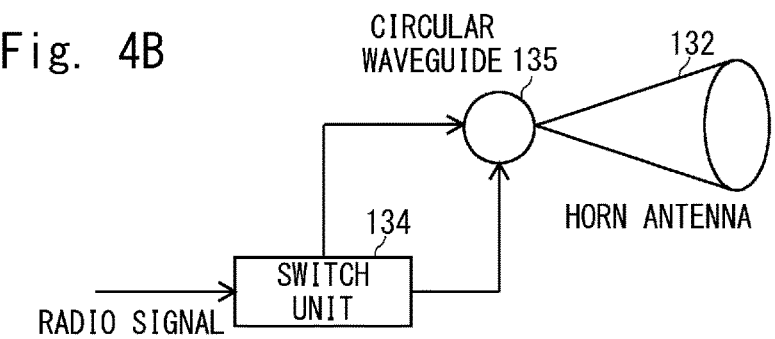
FIG. 4B is a block diagram showing a configuration example of the antenna element capable of switching polarized waves.
Figure 4C:
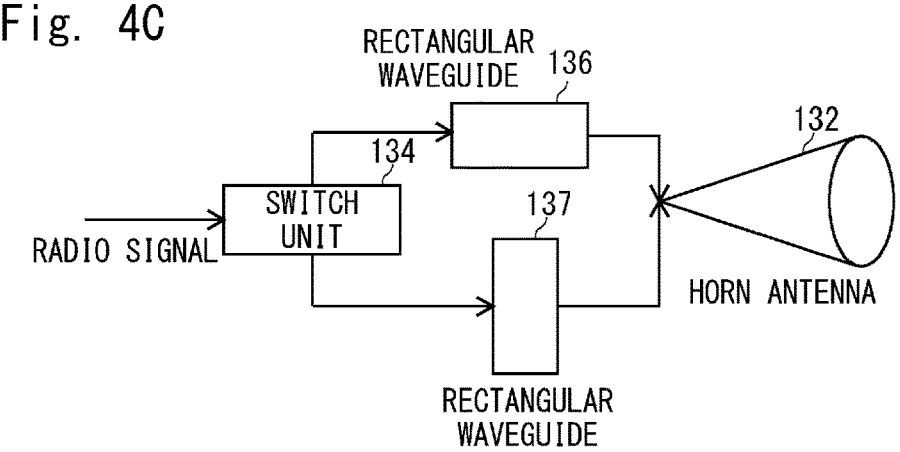
FIG. 4C is a block diagram showing a configuration example of the antenna element capable of switching polarized waves.

FIGS. 4A-4C each show a configuration example of the antenna element 132. In FIGS. 4A-4C, the feeding point of the antenna element 132 is switched using a switch unit 134. The switch unit 134 is configured, for example, as an electronic switch. The switch unit 134 may switch the output destination of the radio signal based on a control signal (switch signal) output from a controller not shown in FIG. 2, thereby changing the feeding point of the antenna element 132.

In the example shown in FIG. 4A, the antenna element 132 is formed as a patch antenna. The switch unit 134 switches the feeding point in the patch antenna between two sides orthogonal to each other. Accordingly, the radio signal output from the antenna element 132 can be switched between the H polarized wave and the V polarized wave.

In each of the examples shown in FIGS. 4B and 4C, the antenna element 132 is configured as a horn antenna. In the example shown in FIG. 4B, a radio signal is input to the antenna element 132, which is the horn antenna, through a circular waveguide 135. The switch unit 134 switches the position in which the radio signal is input to the circular waveguide 135 connected to the horn antenna. Accordingly, the direction of the electric field of the radio signal guided through the circular waveguide 135 can be switched between two directions orthogonal to each other. As a result, the radio signal output from the antenna element 132 can be switched between the H polarized wave and the V polarized wave.

In the example shown in FIG. 4C, the antenna element 132, which is the horn antenna, is connected to a rectangular waveguide 136 and a rectangular waveguide 137. The switch unit 134 switches the output destination of the radio signal between the rectangular waveguide 136 and the rectangular waveguide 137. When the radio signal is input to the antenna element 132 via, for example, the rectangular waveguide 136, the antenna element 132 outputs the radio signal of the V polarized wave. When the radio signal is input to the antenna element 132 via the rectangular waveguide 137, the antenna element 132 outputs the radio signal of the H polarized wave. In this example, the switch unit 134 switches the rectangular waveguide that outputs the radio signal, whereby the radio signal output from the antenna element 132 can be switched between the H polarized wave and the V polarized wave.

Figure 5A:
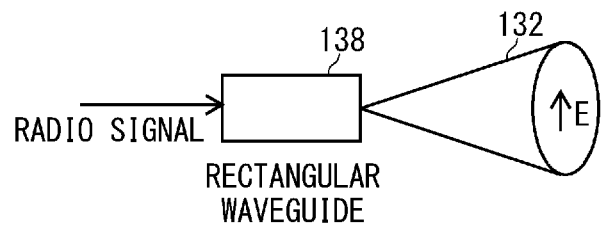
FIG. 5A is a block diagram showing another configuration example of the antenna element capable of switching polarized waves.
Figure 5B:
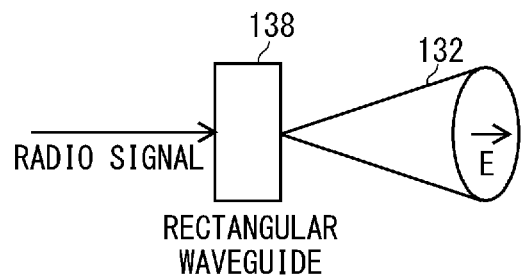
FIG. 5B is a block diagram showing another configuration example of the antenna element capable of switching polarized waves.

FIGS. 5A and 5B each show another configuration example of the antenna element 132. In this example, the antenna element 132 is formed as a horn antenna. In this example, the feeding point of the horn antenna is configured in such a way that it can be physically rotated by 90°. In FIG. 5A, the radio signal guided in the long direction of a rectangular waveguide 138 is input to the antenna element 132, which is the horn antenna. In this case, the antenna element 132 outputs a radio signal of the V polarized wave. As shown in FIG. 5B, when the rectangular waveguide 138 is rotated by 90°, the radio signal guided in the short direction of the rectangular waveguide is input to the antenna element 132. In this case, the antenna element 132 outputs a radio signal of the H polarized wave.

In the wireless communication system 100, the wireless transmitter 110 and the wireless receiver 120, which are wireless stations, are fixed in predetermined positions. Therefore, the distance from the antenna unit 113 on the transmission side to the antenna unit 121 on the reception side, that is, the link distance, is constant when the positions of the wireless stations are fixed. In general, the arrangement of the antenna elements in the antenna units 113 and 121 (the number of antenna elements and the diameter of the antennas) is determined as appropriate depending on the link distance. When, for example, an UCA antenna whose number of antenna elements is eight are used in each of the antenna units 113 and 121, the radius of the circle in which the antenna elements are arranged (diameter of the antenna) is set to a radius r in which MIMO GAIN has a desired property in each OAM mode for a certain link distance L.

However, when the UCA antenna in which eight antenna elements are arranged on the circumference having a radius of r is used in an environment in which the link distance is not L, for example, MIMO GAIN may be degraded in some OAM modes and those OAM modes cannot be used. In high-order OAM modes, in particular, MIMO GAIN tends to be degraded in accordance with the increase in the link distance. When some OAM modes are unavailable, the number of spatial multiplexing is reduced and the communication capacity is reduced by the number of OAM modes that are unavailable.

Figure 6A:
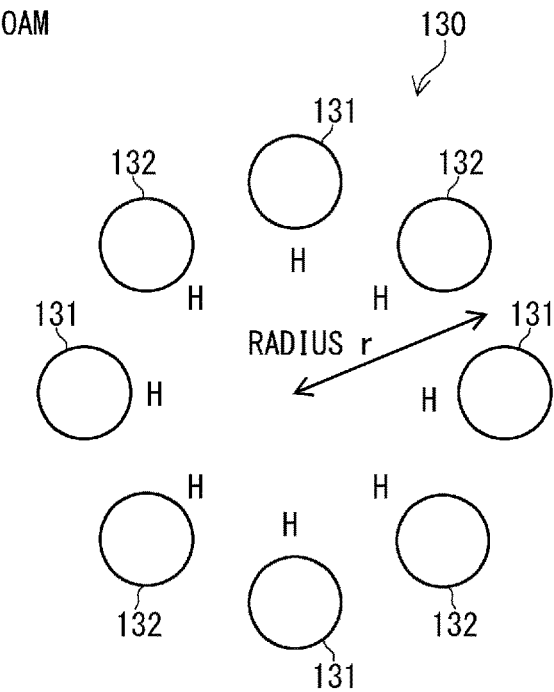
FIG. 6A is a diagram showing a polarized wave of a radio signals output from the respective antenna elements.
Figure 6B:
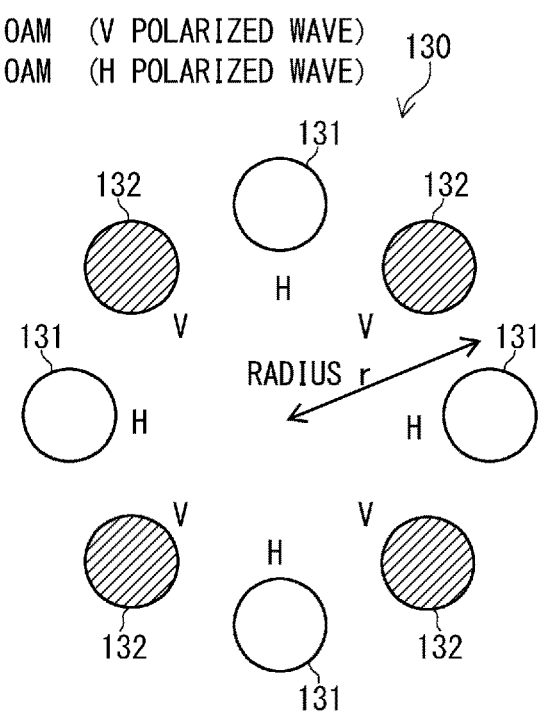
FIG. 6B is a diagram showing a polarized wave of the radio signals output from the respective antenna elements.

In order to address the aforementioned problem, in this example embodiment, the polarized wave of the radio signal output from the antenna element 132 is switched between the H polarized wave and the V polarized wave depending on the link distance. FIGS. 6A and 6B each show the polarized wave of the radio signals output from the respective antenna elements. FIG. 6A shows the polarized wave of the radio signals output from the respective antenna elements when the radio signals of the H polarized wave are output from the antenna elements 132. As shown in FIG. 6A, the radio signals of the H polarized wave are output from both the antenna elements 131 and 132. In this case, 8×8 OAM mode multiplex transmission in which the antenna device having eight antenna elements arranged on a circumference having a radius of r is used on the transmission side and the reception side is achieved. In the 8×8 OAM mode multiplex transmission, mode 0, mode ±1, mode ±2, mode ±3, and mode +4 can be used and the number of spatial multiplexing is 8 at a maximum.

On the other hand, FIG. 6B shows the polarized wave of the radio signals output from the respective antenna elements when the radio signals of the V polarized wave are output from the antenna elements 132. In this case, the antenna elements 131 output the radio signals of the H polarized wave and the antenna elements 132 output the radio signals of the V polarized wave. As described above, the radio signals of the H polarized wave and the radio signals of the V polarized wave do not interfere with each other. Therefore, in the case shown in FIG. 6B, 4×4 OAM mode multiplex transmission in which an antenna device having four antenna elements arranged on a circumference having a radius of r is used on the transmission side and the reception side is achieved in each polarized wave. In the 4×4 OAM mode multiplex transmission, mode 0, mode ±1, and mode +2 are available. In the case shown in FIG. 6B, these four modes can be used for each polarized wave and the number of spatial multiplexing is 8 at a maximum, like in the case of the 8×8 OAM mode multiplex transmission.

Figure 7A:
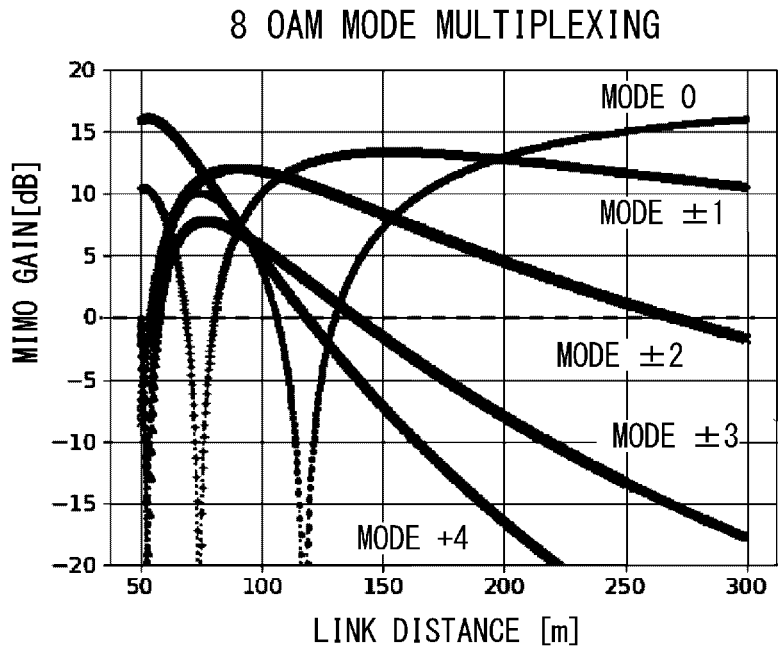
FIG. 7A is a graph showing a relation between a reception quality of an OAM mode radio signal and a link distance.
Figure 7B:
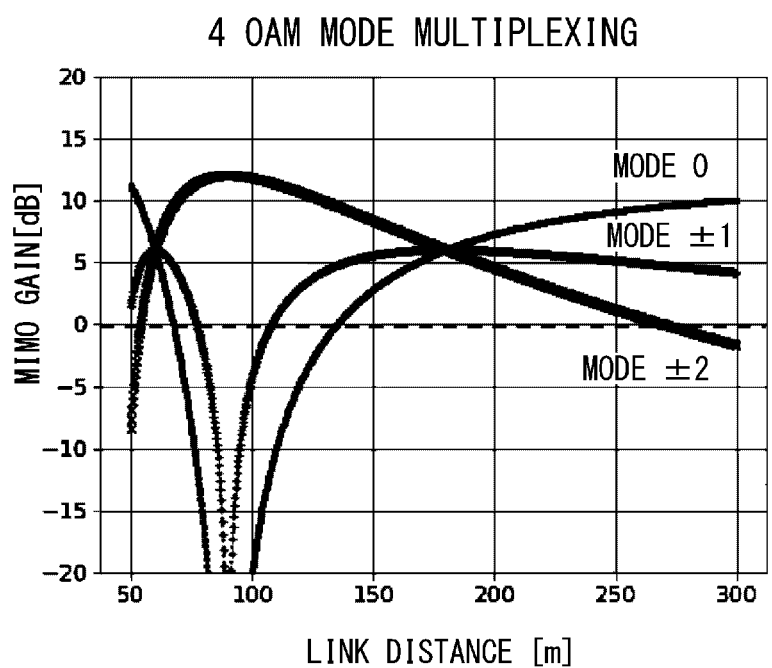
FIG. 7B is a graph showing a relation between the reception quality of the OAM mode radio signal and the link distance.

FIGS. 7A and 7B each show a relation between MIMO GAIN of the OAM mode radio signal in the 150 GHz band and the link distance. In the graphs shown in FIGS. 7A and 7B, the vertical axis indicates MIMO GAIN (dB) and the horizontal axis indicates the link distance (m). FIG. 7A shows a relation between MIMO GAIN and the link distance in the case of the 8×8 OAM mode multiplex transmission (8 OAM mode multiplexing). When MIMO GAIN of each OAM mode in each link distance is obtained using a simulation in a case in which the UCA antenna whose diameter is 0.3 [m] and whose number of antenna elements is eight is used, the results shown in FIG. 7A are obtained.

In this example, it is assumed that the modes whose MIMO GAIN is equal to or above 0 [dB], which is a reference, are available for communication. As shown in FIG. 7A, when the link distance is about 80 [m], MIMO GAIN in each mode exceeds 0 [dB], which is a reference, and the difference between MIMO GAIN in each mode is small. Therefore, it can be said that the UCA antenna whose diameter is 0.3 [m] is suitable for 8 OAM mode multiplexing in the case in which the link distance is 80 [m]. However, in mode +4, in particular, MIMO GAIN is degraded as the link distance increases, and MIMO GAIN becomes lower than 0 [dB], which is a reference, when the link distance is about 120 [m]. Therefore, it can be said that the UCA antenna whose diameter is 0.3 [m] is not suitable for 8 OAM mode multiplexing when the link distance exceeds 120 [m].

FIG. 7B shows a relation between MIMO GAIN and the link distance in the case of the 484 OAM mode multiplex transmission (4 OAM mode multiplexing). When MIMO GAIN in each OAM mode in each link distance is obtained using a simulation in a case in which the UCA antenna whose diameter is 0.3 [m] and whose number of antenna elements is four is used, the results shown in FIG. 7B are obtained.

As shown in FIG. 7B, when the link distance is about 180 [m], MIMO GAIN in each mode exceeds 0 [dB], which is a reference, and the difference between them is small. Therefore, it can be said that the UCA antenna whose diameter is 0.3 [m] is suitable for 4 OAM mode multiplexing in the case in which the link distance is 180 [m]. However, in a range in which the link distance is short, MIMO GAIN of, in particular, mode 0 and mode ±1 becomes lower than 0 [dB], which is a reference. Therefore, it can be said that the UCA antenna whose diameter is 0.3 is not suitable for 4 OAM mode multiplexing in the case in which the link distance is short.

A designer acquires the link distance from, for example, the positional relation between the place where the wireless transmitter 110 that performs line-of-sight communication (see FIG. 2) is installed and the place where the wireless receiver 120 is installed prior to installation of the antenna. The designer performs a simulation and calculates the reception quality in the acquired link distance in a case in which radio signals of a single polarized wave are output from the antenna elements 131 and 132 (see FIG. 6A). Further, the designer calculates the reception quality in the acquired link distance in a case in which radio signals whose polarization directions are orthogonal to each other are output from the antenna elements 131 and 132 (see FIG. 6B). The designer compares the calculated reception qualities to determine which reception quality is better when the link distance is the acquired one.

It is assumed that the designer has determined that the reception quality when the radio signals of the same polarized wave are output from the antenna elements 131 and 132 is high. In this case, controllers (not shown) in the wireless transmitter 110 and the wireless receiver 120 output control signals for causing the antenna element 132 to output the radio signal of the H polarized wave to the switch unit 134 (see FIGS. 4A-4C). The designer may instruct an antenna installation worker to rotate the direction of the rectangular waveguide 138 (see FIGS. 5A and 5B) to such a direction that it causes the antenna element 132 to output the radio signal of the H polarized wave when the feeding point of the antenna element 132 can be physically changed. In the following process, the direction of the rectangular waveguide 138 is fixed to this direction. During the operation of the wireless communication system 100, the antenna element 132 outputs the radio signal of the H polarized wave.

Contrary to the above, assume that the designer has determined that the reception quality when radio signals whose polarization directions are orthogonal to each other are output from the antenna elements 131 and 132 is high. In this case, controllers (not shown) in the wireless transmitter 110 and the wireless receiver 120 output control signals for causing the antenna element 132 to output the radio signal of the V polarized wave to the switch unit 134. The designer may instruct the antenna installation worker to rotate the direction of the rectangular waveguide 138 to such a direction that it causes the antenna element 132 to output the radio signal of the V polarized wave when the feeding point of the antenna element 132 can be physically changed. In the following process, the direction of the rectangular waveguide 138 is fixed to this direction. During the operation of the wireless communication system 100, the antenna element 132 outputs the radio signal of the V polarized wave.

The designer sets the weight matrix used in each of the linear precoder 112 and the interference compensator 123 depending on whether the radio signal output from the antenna element 132 is the H polarized wave or the V polarized wave in the wireless transmitter 110 and the wireless receiver 120. During the operation of the wireless communication system 100, the linear precoder 112 multiplexes the plurality of modulation signals to the plurality of OAM modes using the weight matrix that has been set. During the operation of the wireless communication system 100, the interference compensator 123 separates the signal multiplexed to a plurality of OAM modes using the weight matrix that has been set.

Figure 8A:
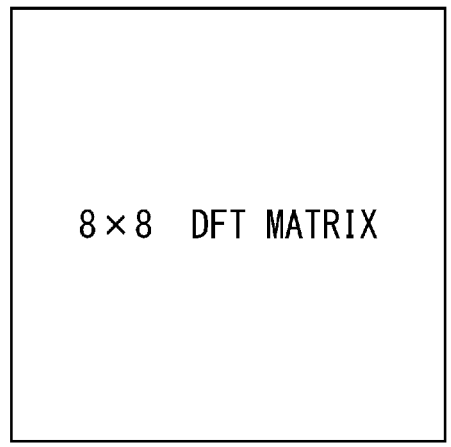
FIG. 8A is a diagram showing a weight matrix.
Figure 8B:
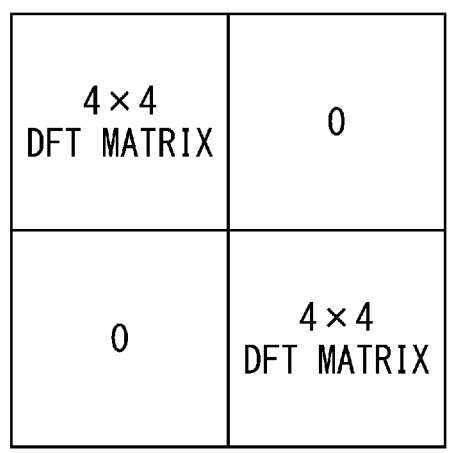
FIG. 8B is a diagram showing the weight matrix.

FIGS. 8A and 8B each show a weight matrix used in the linear precoder 112 and the interference compensator 123. In this example, it is assumed that M=N=8. When the radio signal output from the antenna element 132 is the H polarized wave, the linear precoder 112 and the interference compensator 123 use the 8×8 DFT matrix (see FIG. 8A). That is, when the 8×8 OAM mode multiplex transmission is executed, the linear precoder 112 and the interference compensator 123 use the 8×8 DFT matrix. On the other hand, when the radio signal output from the antenna element 132 is the V polarized wave, the linear precoder 112 and the interference compensator 123 use a weight matrix in which two 4×4 DFT matrices are arranged (see FIG. 8B). That is, when the 4×4 OAM mode multiplex transmission is executed in each of the polarized waves, the linear precoder 112 and the interference compensator 123 use a weight matrix in which two 4×4 DFT matrices are arranged. In this case, in the weight matrix, elements in which the 4×4 DFT matrix is not arranged are filled with 0. As described above, by switching the weight matrix depending on whether the 888 OAM mode multiplex transmission is executed or the 4×4 OAM mode multiplex transmission is executed for each polarized wave, processing in accordance with both types of the OAM mode multiplex transmission can be switched.

In this example embodiment, the antenna device 130 includes the antenna elements 132 capable of switching the polarization direction of the radio signals to be output. The antenna device 130 is able to output radio signals of a single polarization direction from each of the antenna elements 131 and 132. In this case, the 8×8 OAM mode multiplex transmission is, for example, executed in the wireless communication system 100. Further, the antenna device 130 is able to output radio signals whose polarization directions are orthogonal to each other from the antenna elements 131 and 132. In this case, in the wireless communication system 100, the 4×4 OAM mode multiplex transmission is, for example, executed for each polarization direction.

The property of the reception quality with respect to the link distance in the case in which the radio signals of a single polarization direction are output from the antenna elements 131 and 132 and the property of the reception quality with respect to the link distance in the case in which the radio signals whose polarization directions are orthogonal to each other are output are different from each other. When, for example, the reception quality is deteriorated when radio signals whose polarization direction is the same are output from the antenna elements 131 and 132 in one link distance, the polarization direction of the radio signal output from the antenna element 132 is changed. Even in this case, since the 4×4 OAM mode multiplex transmission is executed for each polarized wave, the number of spatial multiplexing the same as that in the case of the 8×8 OAM mode multiplex transmission can be achieved. While the polarization direction of the radio signal output from the antenna element 132 is switched in this example embodiment, the physical arrangement of the antenna elements 131 and 132 is not changed. Accordingly, in this example embodiment, the number of data streams spatially multiplexed can be secured without changing the physical arrangement of the antenna elements in various link distances.

When antenna elements are configured so as to be movable in the antenna device, the radius of the array can be adjusted depending on the link distance when the antenna device is installed. However, when the radius of the array is changed, an interface such as a cable that connects the antenna elements and a device of the RF unit needs to be replaced by another one. Further, there is a problem that since the antenna device includes a movable part, the durability of this part is degraded. On the other hand, in this example embodiment, there is no need to change the physical arrangement of the antenna elements, and thus the above problems do not occur.

Figure 9:
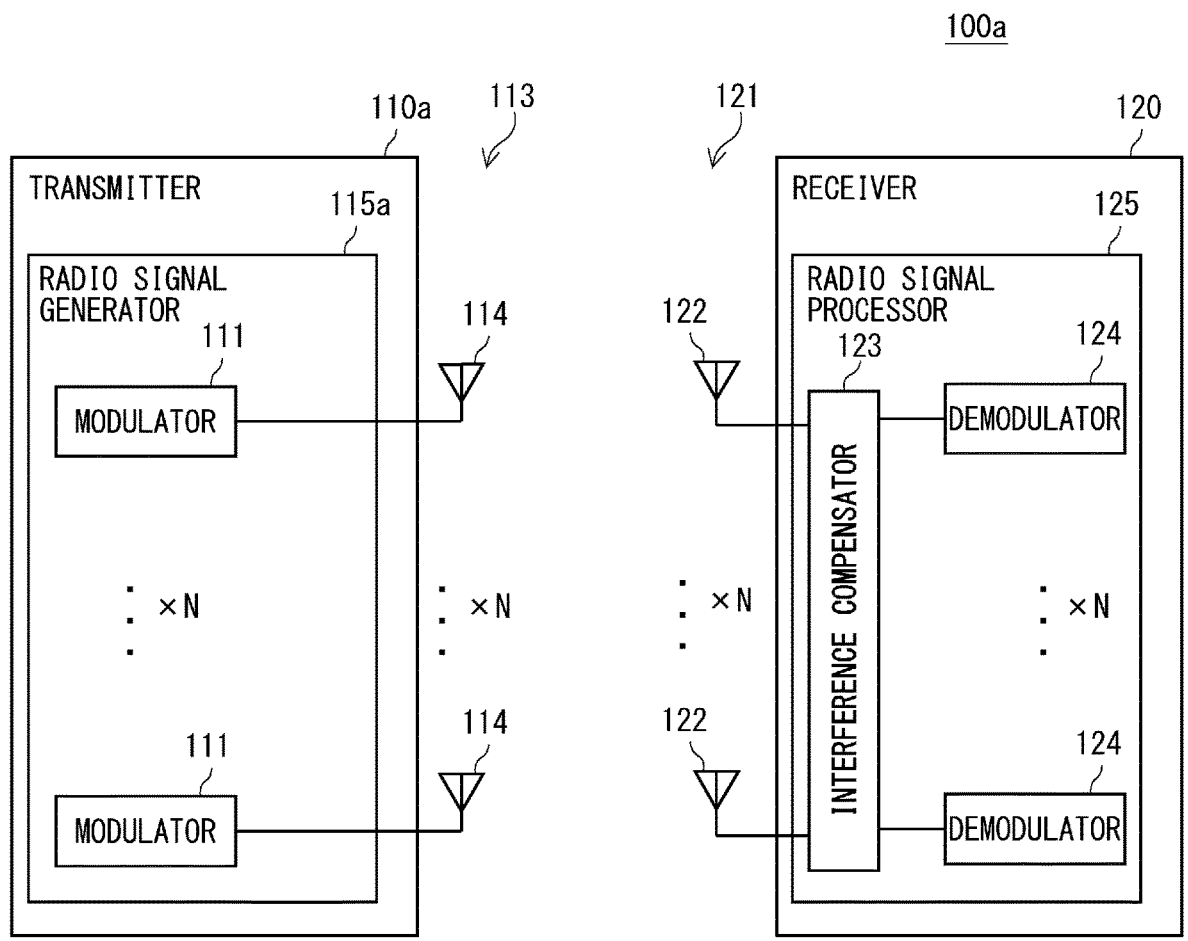
FIG. 9 is a block diagram showing a wireless communication system according to a second example embodiment of the present disclosure.

Next, a second example embodiment of the present disclosure will be described. FIG. 9 shows a wireless communication system according to the second example embodiment of the present disclosure. A wireless communication system 100*a* includes a wireless transmitter 110*a* and a wireless receiver 120*a*. In this example embodiment, the LOS-MIMO transmission is used for spatial multiplex transmission. In this example embodiment, the wireless transmitter 110*a* includes a plurality of modulators 111 and an antenna unit 113. The wireless transmitter 110*a* according to this example embodiment is different from the wireless transmitter 110 according to the first example embodiment in that the wireless transmitter 110*a* does not include the linear precoder 112 shown in FIG. 2. The other configurations may be similar to the configurations of the first example embodiment.

In this example embodiment, the antenna device 130 shown in FIG. 3 is, for example, used for the antenna units 113 and 121. When the radio signals of the same polarized wave are output from the antenna elements 131 and 132 (see FIG. 6A), the 8×8 LOS-MIMO transmission in which the antenna device having eight antenna elements that are arranged is used on the transmission side and the reception side is achieved. When the 8×8 LOS-MIMO transmission is executed, the number of data streams spatially multiplexed is 8.

On the other hand, when the radio signals whose polarization directions are orthogonal to each other are output from the antenna elements 131 and 132 (see FIG. 6B), in each polarized wave, the 4×4 LOS-MIMO transmission in which the antenna device having four antenna elements that are arranged is used on the transmission side and the reception side is achieved. When the 4×4 LOS-MIMO transmission is executed in each of the polarized waves, the number of data streams spatially multiplexed is 8, like in the case of the 8×8 LOS-MIMO transmission.

Figure 10A:
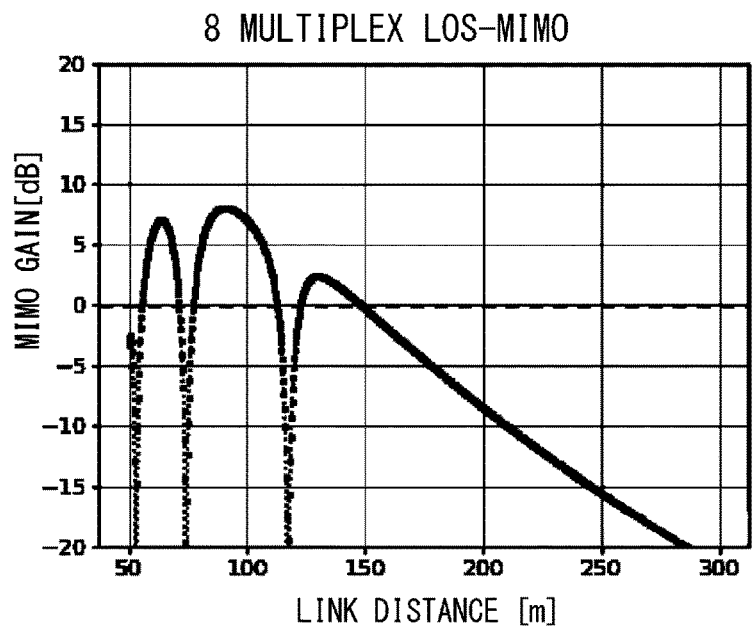
FIG. 10A is a graph showing a relation between a reception quality and a link distance in LOS-MIMO transmission.
Figure 10B:
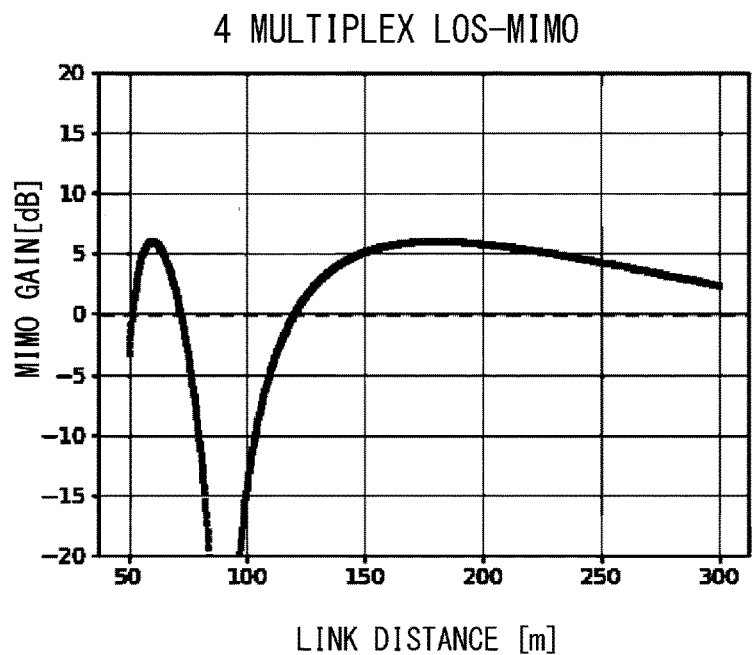
FIG. 10B is a graph showing a relation between the reception quality and the link distance in LOS-MIMO transmission.

FIGS. 10A and 10B each show a relation between MIMO GAIN and the link distance in the LOS-MIMO transmission in 150 GHz band. In the graphs shown in FIGS. 10A and 10B, the vertical axis indicates MIMO GAIN (dB) and the horizontal axis indicates the link distance (m). FIG. 10A shows a relation between MIMO GAIN and the link distance in the case of the 8×8 LOS-MIMO transmission (8 multiplex LOS-MIMO). When MIMO GAIN in each link distance is obtained using a simulation in a case in which the UCA antenna whose diameter is 0.3 [m] and whose number of antenna elements is eight is used, the results shown in FIG. 10A are obtained.

It is assumed here that communication is available when MIMO GAIN is equal to or larger than 0 [dB], which is a reference. As shown in FIG. 10A, when the link distance is about 80 [m], MIMO GAIN exceeds 0 [dB], which is a reference, and has a local maximum value. Therefore, it can be said that the UCA antenna whose diameter is 0.3 [m] is suitable for 8 multiplex LOS-MIMO in the case in which the link distance is 80 [m]. However, MIMO GAIN is degraded as the link distance increases, and MIMO GAIN becomes lower than 0 [dB], which is a reference, when the link distance is about 150 [m]. Therefore, it can be said that the UCA antenna whose diameter is 0.3 [m] is not suitable for 8 multiplex LOS-MIMO transmission when the link distance exceeds 150 [m].

FIG. 10B shows a relation between MIMO GAIN and the link distance in the case of the 4×4 LOS-MIMO transmission (4 multiplex LOS-MIMO). When MIMO GAIN in each link distance is obtained using a simulation in a case in which the UCA antenna whose diameter is 0.3 [m] and whose number of antenna elements is four is used, the results shown in FIG. 10B are obtained.

As shown in FIG. 10B, when the link distance is about 180 [m], MIMO GAIN in each mode exceeds 0 [dB], which is a reference, and has a local maximum value. Therefore, it can be said that the UCA antenna whose diameter is 0.3 [m] is suitable for 4 multiplex LOS-MIMO when the link distance is 180 [m]. However, in the range in which the link distance is from about 70 [m] to about 120[m], MIMO GAIN is below 0 [dB], which is a reference. Therefore, it can be said that the UCA antenna whose diameter is 0.3 is not suitable for 4 multiplex LOS-MIMO in the above link distances.

The selection of 8 multiplex LOS-MIMO or 4 multiplex LOS-MIMO for each polarized wave depending on the link distance may be similar to that in the first example embodiment. The designer acquires the link distance from the positional relation between the place where the wireless transmitter 110a (see FIG. 9) that performs line-of-sight communication is installed and the place where the wireless receiver 120 is installed prior to installation of the antenna. The designer compares the reception quality in the case of 8 multiplex LOS-MIMO and the reception quality in the case of 4 multiplex LOS-MIMO for each polarized wave in the acquired link distance to determine which reception quality is better. The designer selects 8 multiplex LOS-MIMO or 4 multiplex LOS-MIMO for each polarized wave based on the result of the determination.

In this example embodiment, in the wireless communication system 100a, 8 multiplex LOS-MIMO or 4 multiplex LOS-MIMO for each polarized wave is executed depending on the link distance. In the case of the LOS-MIMO transmission as well, like in the case of the OAM mode multiplex transmission, the number of data streams spatially multiplexed can be secured without changing the physical arrangement of the antenna elements in various link distances.

While the example in which the antenna device 130 includes the antenna elements 131 and the antenna elements 132 has been described in each of the above example embodiments, the present disclosure is not limited thereto. In the antenna device 130, all the antenna elements may be composed of the antenna elements 132. In other words, in the antenna device 130, all the antenna elements may be able to output the radio signals of the H polarized wave and the radio signals of the V polarized wave while switching them. Even in this case as well, the radio signals of the H polarized wave can be output from all the antenna elements and the 8×8 OAM mode multiplex transmission can be achieved, like in the case shown in FIG. 6A. Further, the radio signals of the H polarized wave and the radio signals of the V polarized wave can be alternately output from the antenna elements along the circumferential direction. In this case, like in the case shown in FIG. 6B, the 4×4 OAM mode multiplex transmission can be achieved for each polarized wave.

Figure 11:
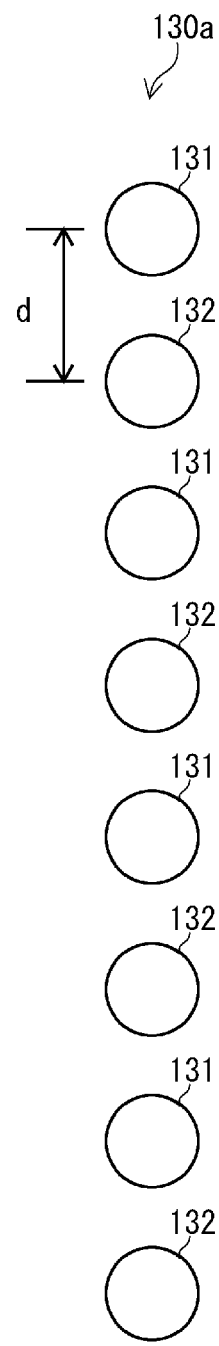
FIG. 11 is a front view showing another configuration example of an antenna device.

While the example in which the UCA antenna is used for the LOS-MIMO transmission has been described in the second example embodiment, the present disclosure is not limited thereto. FIG. 11 shows another configuration example of the antenna device. In this configuration example, an antenna device 130a includes a plurality of antenna elements 131 and 132 that are linearly arranged. In the antenna device 130a, the antenna elements 131 and the antenna elements 132 are alternately arranged. The interval between the antenna element 131 and the antenna element 132 is denoted by d. When the radio signals of the H polarized wave are output from the antenna elements 131 and 132, the interval between the antenna elements from which the radio signals of the H polarized wave are output is d.

Figure 12:
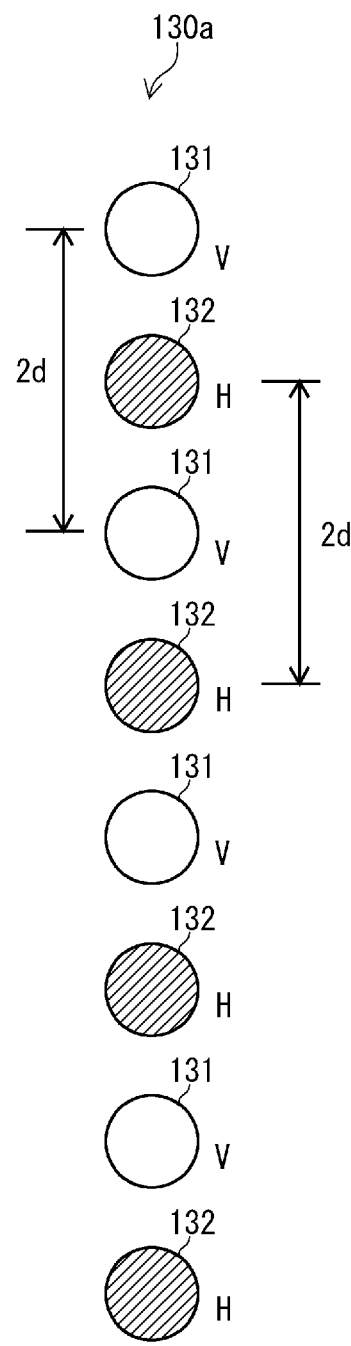
FIG. 12 is a diagram showing a polarized wave of the radio signals output from the respective antenna elements.

FIG. 12 shows a polarized wave of the radio signals output from the respective antenna elements when the antenna elements 131 output the radio signals of the H polarized wave and the antenna elements 132 output the radio signals of the V polarized wave. In this case, the interval between the antenna elements that output the radio signals of the H polarized wave is 2d. Further, the interval between the antenna elements that output the radio signals of the V polarized wave is also 2d. As described above, even when the antenna elements are linearly arranged, the arrangement of the antenna elements can be changed for each polarization direction without changing the physical arrangement of the antenna elements. Therefore, like in the case in which the UCA antenna is used, the number of data streams spatially multiplexed can be secured without changing the physical arrangement of the antenna elements in various link distances.

While the invention has been particularly shown and described with reference to embodiments thereof, the invention is not limited to these embodiments. It will be understood by those of ordinary skill in the art that various changes in form and details may be made therein without departing from the spirit and scope of the present invention as defined by the claims.

The whole or part of the exemplary embodiments disclosed above can be described as, but not limited to, the following supplementary notes.

(Supplementary Note 1)

An antenna device comprising a plurality of antenna elements configured to output radio signals transmitted to another antenna device arranged so as to be opposed to the antenna device, wherein at least one of the plurality of antenna elements is configured in such a way that a polarization direction of the radio signals can be switched between a first direction and a second direction that is orthogonal to the first direction.

[Supplementary Note 2]

The antenna device according to Supplementary Note 1, wherein at least one of the plurality of antenna elements is configured in such a way that the polarization direction of the radio signals can be switched between the first direction and the second direction since a feeding point of the radio signals is changed.

[Supplementary Note 3]

The antenna device according to Supplementary Note 2, wherein, in at least one of the plurality of antenna elements, the feeding point is configured in such a way that it can be electrically or physically changed.

[Supplementary Note 4]

The antenna device according to any one of Supplementary Notes 1 to 3, wherein the plurality of antenna elements comprise first antenna elements configured to output radio signals whose polarization direction is the first direction and second antenna elements capable of switching a polarization direction of radio signals that the second antenna elements output between the first direction and the second direction.

[Supplementary Note 5]

The antenna device according to any one of Supplementary Notes 1 to 4, wherein the plurality of antenna elements are arranged at equal intervals on a circumference.

[Supplementary Note 6]

The antenna device according to Supplementary Note 4, wherein the plurality of antenna elements are arranged at equal intervals on a circumference, and the first antenna elements and the second antenna elements are alternately arranged on the circumference.

[Supplementary Note 7]

The antenna device according to any one of Supplementary Notes 1 to 4, wherein the plurality of antenna elements are arranged at equal intervals on a straight line.

[Supplementary Note 8]

The antenna device according to Supplementary Note 4, wherein the plurality of antenna elements are arranged at equal intervals on a straight line, and the first antenna elements and the second antenna elements are alternately arranged on the straight line.

[Supplementary Note 9]

The antenna device according to any one of Supplementary Notes 1 to 8, wherein the plurality of antenna elements further receive radio signals transmitted from another antenna device arranged so as to be opposed to the antenna device.

[Supplementary Note 10]

An antenna device comprising:

a plurality of antenna elements configured to receive radio signals transmitted from another antenna device arranged so as to be opposed to the antenna device, wherein at least one of the plurality of antenna elements is configured in such a way that a polarization direction of the received radio signals can be switched between a first direction and a second direction that is orthogonal to the first direction.

[Supplementary Note 11]

A wireless transmitter comprising:

a radio signal generator configured to generate radio signals transmitted to a wireless receiver arranged so as to be opposed to the wireless transmitter; and an antenna unit including a plurality of antenna elements configured to output the radio signals to the wireless receiver, wherein at least one of the plurality of antenna elements is configured in such a way that a polarization direction of the radio signals can be switched between a first direction and a second direction that is orthogonal to the first direction.

[Supplementary Note 12]

The wireless transmitter according to Supplementary Note 11, wherein at least one of the plurality of antenna elements is configured in such a way that the polarization direction of the radio signals can be switched between the first direction and the second direction since a feeding point of the radio signals is changed.

[Supplementary Note 13]

The wireless transmitter according to Supplementary Note 11 or 12, wherein the plurality of antenna elements comprise first antenna elements configured to output radio signals whose polarization direction is the first direction and second antenna elements capable of switching a polarization direction of radio signals that the second antenna elements output between the first direction and the second direction.

[Supplementary Note 14]

A wireless receiver comprising:

an antenna unit including a plurality of antenna elements that receive radio signals from a wireless transmitter arranged to be opposed to the wireless receiver; and a radio signal processor configured to demodulate a transmission signal from the radio signal, wherein at least one of the plurality of antenna elements is configured in such a way that a polarization direction of the radio signals can be switched between a first direction and a second direction that is orthogonal to the first direction.

[Supplementary Note 15]

The wireless receiver according to Supplementary Note 14, wherein at least one of the plurality of antenna elements is configured in such a way that the polarization direction of the radio signals can be switched between the first direction and the second direction since a feeding point of the radio signals is changed.

[Supplementary Note 16]

The wireless receiver according to Supplementary Note 14 or 15, wherein the plurality of antenna elements comprise first antenna elements configured to output radio signals whose polarization direction is the first direction and second antenna elements capable of switching a polarization direction of radio signals that the second antenna elements output between the first direction and the second direction.

[Supplementary Note 17]

A wireless communication system comprising:

a wireless transmitter including a radio signal generator configured to generate radio signals and a transmission antenna unit including a plurality of transmission antenna elements that output the radio signals; and a wireless receiver including a reception antenna unit including a plurality of reception antenna elements that receive radio signals from the wireless transmitter and a radio signal processor configured to demodulate a transmission signal from the radio signal, wherein at least one of the plurality of transmission antenna elements is configured in such a way that a polarization direction of the radio signals can be switched between a first direction and a second direction that is orthogonal to the first direction, and at least one of the plurality of reception antenna elements is configured in such a way that the polarization direction of the radio signals can be switched between a first direction and a second direction that is orthogonal to the first direction.

[Supplementary Note 18]

The wireless communication system according to Supplementary Note 17, wherein at least one of the plurality of transmission antenna elements is configured in such a way that the polarization direction of the radio signals can be switched between the first direction and the second direction since a feeding point of the radio signal is changed, and at least one of the plurality of reception antenna elements is configured in such a way that the polarization direction of the radio signals can be switched between the first direction and the second direction since a feeding point of the radio signals is changed.

[Supplementary Note 19]

The wireless communication system according to Supplementary Note 17 or 18, wherein each of the plurality of transmission antenna elements and the plurality of reception antenna elements comprise first antenna elements configured to output radio signals whose polarization direction is the first direction and second antenna elements capable of switching a polarization direction of radio signals that the second antenna elements output between the first direction and the second direction.

What is claimed is:

1. An antenna device comprising a plurality of antenna elements configured to output radio signals transmitted to another antenna device arranged so as to be opposed to the antenna device,
   wherein at least one of the plurality of antenna elements is configured in such a way that a polarization direction of the radio signals can be switched between a first direction and a second direction that is orthogonal to the first direction,
   the plurality of antenna elements comprise first antenna elements configured to output radio signals whose polarization direction is the first direction and second antenna elements capable of switching a polarization direction of radio signals that the second antenna elements output between the first direction and the second direction, and
   the first antenna elements and the second antenna elements are alternately arranged at equal intervals in a predetermined direction on a plane such that the respective intervals between the adjacent first antenna elements and second antenna elements are predetermined intervals.

2. The antenna device according to claim 1, wherein at least one of the plurality of antenna elements is configured in such a way that the polarization direction of the radio signals can be switched between the first direction and the second direction since a feeding point of the radio signals is changed.

3. The antenna device according to claim 2, wherein, in at least one of the plurality of antenna elements, the feeding point is configured in such a way that it can be electrically or physically changed.

4. The antenna device according to claim 1, wherein
   the plurality of antenna elements are arranged on the plane at equal intervals along a circumferential direction on a circumference, and
   the first antenna elements and the second antenna elements are alternately arranged along the circumferential direction on the circumference.

5. The antenna device according to claim 1, wherein
   the plurality of antenna elements are arranged on the plane at equal intervals on a straight line, and
   the first antenna elements and the second antenna elements are alternately arranged on the straight line.

6. The antenna device according to claim 1, wherein the plurality of antenna elements further receive radio signals transmitted from another antenna device arranged so as to be opposed to the antenna device.

7. A wireless transmitter comprising:
   a radio signal generator configured to generate radio signals transmitted to a wireless receiver arranged so as to be opposed to the wireless transmitter; and
   an antenna unit including a plurality of antenna elements configured to output the radio signals to the wireless receiver,
   wherein at least one of the plurality of antenna elements is configured in such a way that a polarization direction of the radio signals can be switched between a first direction and a second direction that is orthogonal to the first direction,
   the plurality of antenna elements comprise first antenna elements configured to output radio signals whose polarization direction is the first direction and second antenna elements capable of switching a polarization direction of radio signals that the second antenna elements output between the first direction and the second direction, and
   the first antenna elements and the second antenna elements are alternately arranged at equal intervals in a predetermined direction on a plane such that the respective intervals between the adjacent first antenna elements and second antenna elements are predetermined intervals.

8. The wireless transmitter according to claim 7, wherein at least one of the plurality of antenna elements is configured in such a way that the polarization direction of the radio signals can be switched between the first direction and the second direction since a feeding point of the radio signals is changed.

9. A wireless communication system comprising:
   a wireless transmitter including a radio signal generator configured to generate radio signals and a transmission antenna unit including a plurality of transmission antenna elements that output the radio signals,
   a wireless receiver including a reception antenna unit including a plurality of reception antenna elements that receive radio signals from the wireless transmitter and a radio signal processor configured to demodulate a transmission signal from the radio signal, wherein
   at least one of the plurality of transmission antenna elements is configured in such a way that a polarization direction of the radio signals can be switched between a first direction and a second direction that is orthogonal to the first direction, at least one of the plurality of reception antenna elements is configured in such a way that the polarization direction of the radio signals can be switched between a first direction and a second direction that is orthogonal to the first direction, the plurality of transmission antenna elements comprise first transmission antenna elements configured to output radio signals whose polarization direction is the first direction and second transmission antenna elements capable of switching a polarization direction of radio signals that the second antenna elements output between the first direction and the second direction, the first transmission antenna elements and the transmission second antenna elements are alternately arranged at equal intervals in a predetermined direction on a first plane such that the respective intervals between the adjacent first transmission antenna elements and second transmission antenna elements are predetermined intervals, the plurality of reception antenna elements comprise first reception antenna elements configured to receive radio signals whose polarization direction is the first direction and second reception antenna elements capable of switching a polarization direction of radio signals that the second reception antenna elements receive between the first direction and the second direction, and the first reception antenna elements and the reception second antenna elements are alternately arranged at equal intervals in a predetermined direction on a plane such that the respective intervals between the adjacent first reception antenna elements and second reception antenna elements are predetermined intervals.

10. The wireless communication system according to claim 9, wherein at least one of the plurality of transmission antenna elements is configured in such a way that the polarization direction of the radio signals can be switched between the first direction and the second direction since a feeding point of the radio signal is changed, and at least one of the plurality of reception antenna elements is configured in such a way that the polarization direction of the radio signals can be switched between the first direction and the second direction since a feeding point of the radio signals is changed.

\* \* \* \* \*